United States Patent
Scobbie

(10) Patent No.: US 7,313,108 B2
(45) Date of Patent: Dec. 25, 2007

(54) SERVICE USAGE RECORDS FOR MOBILE DATA COMMUNICATIONS

(75) Inventor: Donald MacGregor Scobbie, Edinburgh (GB)

(73) Assignee: Agilent Technologies, Inc., Palo Alto, CA (US)

( * ) Notice: Subject to any disclaimer, the term of this patent is extended or adjusted under 35 U.S.C. 154(b) by 631 days.

(21) Appl. No.: 10/865,573

(22) Filed: Jun. 10, 2004

(65) Prior Publication Data

US 2004/0264405 A1 Dec. 30, 2004

(30) Foreign Application Priority Data

Jun. 14, 2003 (GB) ................. 0313812.0

(51) Int. Cl.
*H04Q 7/00* (2006.01)

(52) U.S. Cl. ................. 370/328; 370/338; 370/235; 370/331; 455/466; 455/436

(58) Field of Classification Search ........ 370/331–334, 370/235–238, 328; 455/466, 436, 437, 432.1
See application file for complete search history.

(56) References Cited

U.S. PATENT DOCUMENTS

| | | | |
|---|---|---|---|
| 4,651,298 A * | 3/1987 | Currier, Jr. ................. 710/261 |
| 6,430,275 B1 | 8/2002 | Voit et al. ............... 379/114.17 |
| 6,463,055 B1 * | 10/2002 | Lupien et al. .............. 370/353 |
| 6,469,998 B1 * | 10/2002 | Burgaleta Salinas et al. ........................... 370/338 |
| 6,904,466 B1 * | 6/2005 | Ishiyama et al. ........... 709/245 |
| 6,955,918 B2 * | 10/2005 | Haumont et al. ........... 455/436 |
| 2002/0046277 A1 | 4/2002 | Barna et al. ................. 709/224 |
| 2003/0081607 A1 * | 5/2003 | Kavanagh .................. 370/392 |
| 2004/0193513 A1 * | 9/2004 | Pruss et al. .................. 705/30 |
| 2004/0210522 A1 * | 10/2004 | Bissantz et al. .............. 705/40 |
| 2005/0053070 A1 * | 3/2005 | Jouppi ..................... 370/395.3 |
| 2005/0097087 A1 * | 5/2005 | Punaganti Venkata et al. .. 707/3 |
| 2005/0220139 A1 * | 10/2005 | Aholainen .................. 370/466 |
| 2005/0259631 A1 * | 11/2005 | Rajahalme .................. 370/351 |
| 2005/0265279 A1 * | 12/2005 | Markovic et al. ........... 370/328 |

FOREIGN PATENT DOCUMENTS

| | | |
|---|---|---|
| EP | 1 249 986 | 11/2003 |
| WO | WO 02/082720 | 10/2002 |

* cited by examiner

*Primary Examiner*—Matthew Anderson
*Assistant Examiner*—Minh Dao

(57) ABSTRACT

A method of creating service usage records summarising usage of mobile data communications services, comprises monitoring message packets traversing a signalling link between a serving support node and a gateway support node, these message packets including packets for tunnelling data being transported by a mobile data communications service. First information is extracted from the data tunnelling packets, relating to data being tunnelled by said packets, and second information is extracted, relating to implementation of the data tunnelling. The correlating said first and second information are correlated to generate a service usage record. A source of data packets can be characterised by examining a tunnel destination address in each monitored message packet, and characterising the message packet as mobile-originated if the tunnel destination address is a gateway support node and as mobile-terminated if the tunnel destination address is a serving support node.

12 Claims, 3 Drawing Sheets

MSC  Mobile Switching Centre
SMSG Short Message Service Gateway
EIR  Equipment Identity Register
HLR  Home Location Register
BTS  Base Transceiver Station
BSC  Base Station Controller
SGSN Serving GPRS Support Node
GGSN Gateway GPRS Support Node

SERVICE USAGE RECORDS FOR MOBILE DATA COMMUNICATIONS

This invention relates to methods and apparatus for creating service usage records summarising usage of mobile data communications services, such as the General Packet Radio Service (GPRS) that can be provided in GSM mobile phone networks.

BACKGROUND ART

GSM mobile phone networks use a signalling system to coordinate their operation. This signalling system is typically operated in accordance with the ITU Signalling System No. 7 (SS7) suite of protocols. It is known to monitor SS7 signalling messages traversing the signalling system in order to observe the operation of the network, and to obtain information about usage of the network's facilities. Such information is often collected in Call Detail Records (CDRs) (e.g. for voice calls) and Transaction Detail Records (TDRs) (e.g. for the use of other GSM services). For example SS7 ISDN User Part (ISUP) protocol messages are used to build CDRs to summarise voice service use, and SS7 Mobile Application Part (MAP) protocol messages, supported by the Transaction Capabilities Application Part (TCAP) protocol, are used to assemble summaries of messaging, mobility and access management activity.

To provide analogous functionality in GPRS networks, an additional transaction builder is required to summarise Internet Protocol (IP) service usage, for example of web browsing and e-mail services. The resulting transaction summaries are usually referred to as IP Data Records (IPDRs) or Service Usage Records (SURs). However, these transaction summaries are not normally built within the telecoms segment of the network (i.e. with access to ISUP and MAP messages) and therefore lack essential information that can only be obtained from these telecoms signalling transactions. For example, key information for billing and customer care includes the subscriber's International Mobile Subscriber Identity (IMSI) and the Mobile Station ISDN number (MSISDN). For monitoring Quality of Service (QoS) and network management the key fields are the GPRS Access Point Name (APN) and the negotiated QoS in the GPRS data access "tunnel" that is established using the GPRS Tunnelling Protocol (GTP, v0 defined in ETSI specification EN 301 347-GSM 09.60 and v1 defined in 3GPP specification TS 29.060). It is necessary therefore to be able to generate in an efficient manner SURs which include information obtained from a telecoms context.

One prior approach involves building IP SURs on the GPRS "Gi" interface. This is a pure computer data interface and carries no telecoms-related signalling messages that may be used to provide the desired information for the SURs. Therefore the separate GPRS "Gn" interface is monitored independently, to provide information on the GTP tunnel maintenance transactions in an entirely separate data feed. The SURs derived from messages on the Gi interface and the signalling transactions monitored on the Gn interface must then be correlated in an additional process in order to augment the SURs with telecoms context information. This approach requires the expense of monitoring equipment on both the Gn and Gi interfaces, additional transaction-building and correlation-computing capacity, and time to perform the correlation process.

DISCLOSURE OF INVENTION

According to one aspect of this invention there is provided a method of creating service usage records summarising usage of mobile data communications services, comprising the steps of:

monitoring message packets traversing a signalling link between a serving support node and a gateway support node, said message packets including packets for tunnelling data being transported by a mobile data communications service;

extracting from said data tunnelling packets first information relating to data being tunnelled by said packets;

extracting from said data tunnelling packets second information relating to implementation of the data tunnelling; and correlating said first and second information to generate a service usage record.

Thus the invention builds IP SURs within the telecoms data tunnel that links the wireless mobile network to the wireline packet data network. Signalling transactions that create, update and delete the telecoms tunnel are monitored to enable the SUR transaction builder to follow the state of the data tunnels, and telecoms information from these transactions is used to enrich the SURs with the required data. This approach is advantageous as it is extremely efficient in use of computing power. In the case of users located within the service area of their "home" network, it can also be accomplished with probe hardware for monitoring signalling messages deployed on one network segment only: the Gn interface.

According to another aspect of this invention there is provided apparatus for creating service usage records summarising usage of mobile data communications services, comprising:

a monitor for monitoring message packets traversing a signalling link between a serving support node and a gateway support node, said message packets including packets for tunnelling data being transported by a mobile data communications service;

a first information extractor for extracting from said data tunnelling packets first information relating to data being tunnelled by said packets;

a second information extractor for extracting from said data tunnelling packets second information relating to implementation of the data tunnelling; and a correlator for correlating said first and second information to generate a service usage record.

According to a further aspect of this invention there is provided a method of characterising a source of a data packet carrying data in a mobile data communications services, comprising the steps of:

monitoring message packets traversing a signalling link between a serving support node and a gateway support node, said message packets including packets for tunnelling data being transported by a mobile data communications service;

examining a tunnel destination address in each said monitored message packet; and characterising the message packet as mobile-originated if the tunnel destination address is a gateway support node and as mobile-terminated if the tunnel destination address is a serving support node.

According to another aspect of this invention there is provided apparatus for characterising a source of a data packet carrying data in a mobile data communications services, comprising:

a monitor for monitoring message packets traversing a signalling link between a serving support node and a gateway support node, said message packets including packets for tunnelling data being transported by a mobile data communications service;

an address examiner for examining a tunnel destination address in each said monitored message packet; and a packet characteriser for characterising the message packet as mobile-originated if the tunnel destination address is a gateway support node and as mobile-terminated if the tunnel destination address is a serving support node

BRIEF DESCRIPTION OF DRAWINGS

A method and apparatus in accordance with this invention, for creating SURs summarising use of a GPRS system, will now be described, by way of example, with reference to the accompanying drawings, in which.

DETAILED DESCRIPTION

Figure 1:
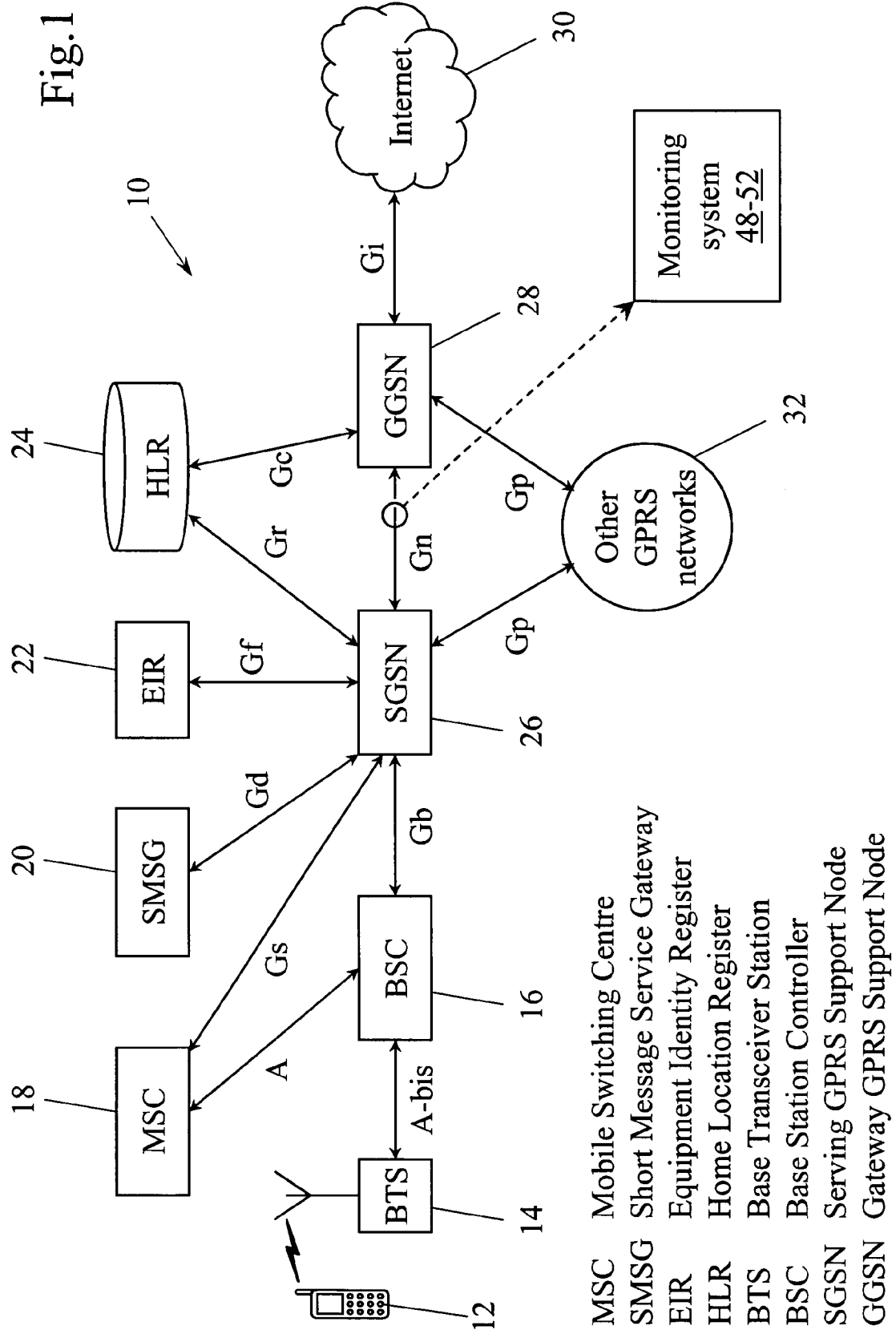
FIG. 1 is a block schematic diagram of a GSM mobile communications network incorporating equipment for providing GPRS service.

FIG. 1 shows the major functional components of a GSM network 10 configured to provide GRPS service. Referring to FIG. 1, a mobile station (MS) 12 communicates over an air (RF) interface with a base transceiver station (BTS) 14 under the control of a base station controller (BSC) 16. The connection of voice calls to the MS 12 is coordinated by a mobile switching centre (MSC) 18, and short message service (SMS) functionality is provided by an SMS Gateway (SMSG) 20. Administrative information about the MS 12 and the subscriber are held in databases comprising an equipment identity register (EIR) 22 and a home location register (HLR) 24. Those skilled in the art will recognise that a complete GSM system typically incorporates additional equipment not shown in FIG. 1, such as a visitor location register (VLR). However, such equipment that is not directly relevant to implementation of the present invention has been omitted from the figure for the sake of clarity.

In order to provide GPRS service, the system also incorporates a Serving GPRS Support Node (SGSN) 26 and a Gateway GPRS Support Node (GGSN) 28. The SGSN 26 routes packet-switched data to and from the MSs within the area it serves. Its principal functions are packet routing, mobile attach and detach procedures, location management, assigning channels and time slots, authentication and charging for calls. The GGSN 28 acts as an interface between the GPRS system and the external packet data network, i.e. the internet 30 shown in FIG. 1. It converts GPRS packets received via the SGSN 26 into the appropriate Packet Data Protocol format (e.g. Internet Protocol) and forwards them into the external internet 30. Likewise it converts IP addresses in received packets into GSM addresses of destination MSs, and routes the converted packets to the appropriate SGSN 26.

The GPRS specifications define various interfaces for connecting the SGSN 26 and GGSN 28 to the other components of the GPRS system, as follows:

Gi, for communications between the GGSN 28 and the external internet 30;

Gc, for communications between the GGSN 28 and the HLR 24;

Gn, for communications between the GGSN 28 and the SGSN 26;

Gr, for communications between the SGSN 26 and the HLR 24;

Gf, for communications between the SGSN 26 and the EIR 22;

Gd, for communications between the SGSN 26 and the SMSG 20

Gs, for communications between the SGSN 26 and the MSC 18;

Gb, for communications between the SGSN 26 and the BSC 16; and

Gp, for communications between from SGSN 26 and the GGSN 28 to GSNs in other GPRS networks 32.

The signalling links over which these interfaces are implemented carry signalling packets containing signalling information for creating, updating and deleting GPRS connections, and other information required in support of these functions, such as for authentication, MS location and mobility support. In addition, some of the links, such as those for the Gi, Gn and Gb interfaces, carry data payload packets (i.e. packets containing data being exchanged between the MS 12 and the external internet 30).

Figure 2:
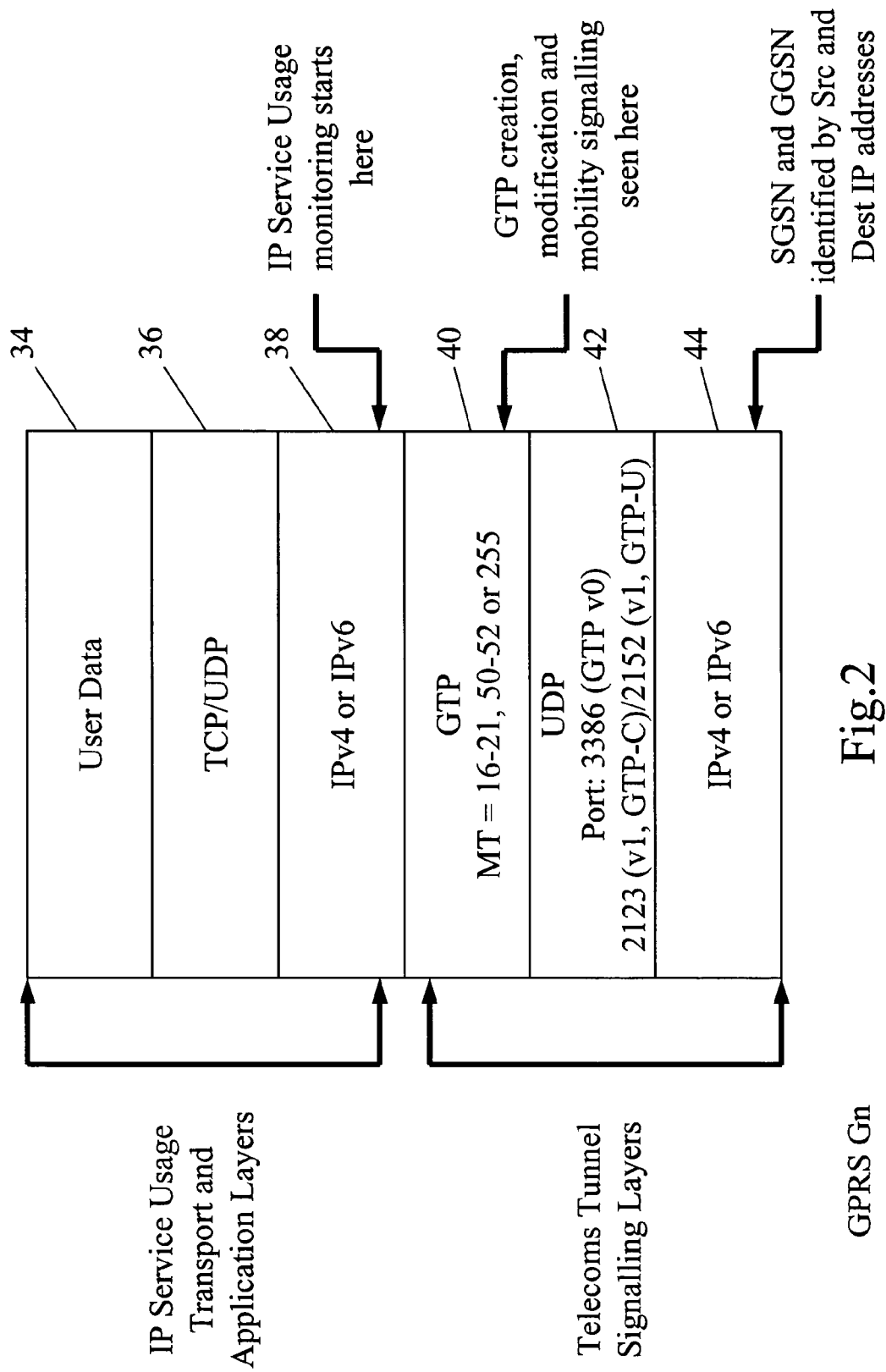
FIG. 2 shows a protocol stack used on a GPRS Gn interface connecting an SGSN to a GGSN.

Each interface is implemented by means of a protocol stack, enabling the required functionality to be defined by reference to various widely-used communications protocols, such as the Transmission Control Protocol (TCP), User Datagram Protocol (UDP), GTP and IP. FIG. 2 shows the protocol stack for the Gn interface between the SGSN 26 and the GGSN 28. Referring to FIG. 2, user data at layer 34 are encapsulated in TCP or UDP packets comprising the next layer 36, and these are in turn are carried over IP (layer 38—as shown, either IPv4 or IPv6 can be used). The layers 34 to 38 comprise the transport and application layers for use by a subscriber of the IP service provided by GPRS.

The IP packets in the layer 38 are "tunnelled" over the IP links to the GPRS network elements (particularly the SGSN 26 and the GGSN 28), that is each packet is encapsulated inside another IP packet and carried to the destination without altering the content of the encapsulated packet. This approach is adopted in order to prevent the network elements from being addressed directly from outside the network, thereby increasing security. This encapsulating packet is formatted as specified in GTP, as shown at 40, with a Message Type (MT) value in the packet header of 255, indicating that the packet contains user data. GTP messages are transferred using the UDP path protocol (layer 42), over IPv4 or IPv6 (layer 44). The layers 40 to 44 comprise the telecoms tunnel signalling layers.

The inventors hereof have recognised that, by monitoring packets traversing the Gn interface links (as described below), it is possible to perform both telecoms signalling analysis and service usage analysis at the same time, because the Gn protocol stack contains sufficient information for this purpose. Signalling transactions that maintain the GPRS network tunnel can be monitored by a state machine within the monitoring system that refers only to the lowermost three layers (40 to 42) of the stack. Service usage by subscribers can be monitored using only the upper three layers (34 to 38) of the stack, but a state machine for doing this has instant access to the signalling information available from the signalling analysis state machine.

In practice an SUR generator may be implemented, for example, by combining three complementary state machines:
a GTP Follower state machine that runs at the telecoms tunnel layer (40 to 44);
a Call Record Generator (CRG) for the service transport layer (36 and 38);
and one or more Content Analysis (CA) state machines for the service application layer (34).

The GTP Follower state machine processes every message monitored on the Gn interface links. If a message is a GTP signalling message it is processed as follows:

Create PDP Context Request messages and Create PDP Context Response messages are used to construct a CREATE transaction for the tunnel record, and to create internal accounting and control structures for tracking use of the tunnel associated with the requested context. Subscriber IMSI and network APN fields are stored at this point for the tunnel lifetime. The network QoS value is also set at this point, but it may be modified subsequently.

Update PDP Context Request and Update PDP Context Response messages are used to construct an UPDATE transaction. This is used principally to maintain the network QoS values for the tunnel.

Delete PDP Context Request and Delete PDP Context Response messages are used to construct a DELETE transaction, which is used to finalise any service usage analysis activities and to destroy the accounting and control structures for the tunnel.

All GTP messages with an MT value of 255 are validated against the existing control structures in the monitoring system, and then passed to the CRG and CA state machines for further analysis. When an SUR is ready to be released by these state machines, the telecoms context information from the signalling analysis performed by the GTP Follower is immediately available to be combined with that SUR.

Figure 3:
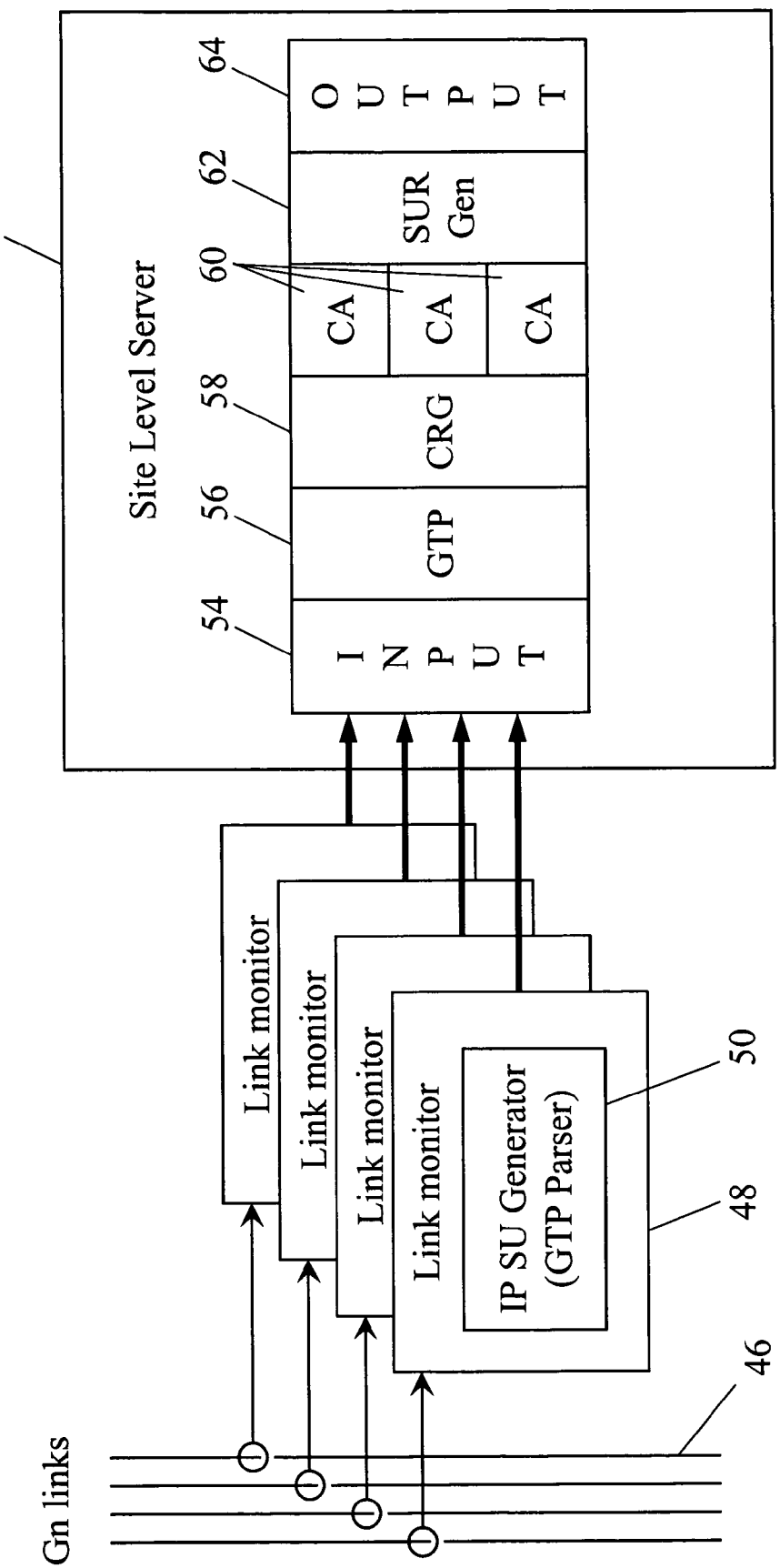
FIG. 3 is a schematic diagram of major functional blocks in a system for creating SURs.

The processes outlined above will now be described in greater detail with reference to FIG. 3, which shows the major functional blocks in apparatus for implementing these processes. Referring to FIG. 3, Gn links 46 are connected to link monitoring cards 48 to enable the packets traversing these links to be passively monitored. The monitoring is passive in the sense that the operation of the links 46 is undisturbed by the presence of the connection to the cards 48. Each card 48 comprises an interface and a processor operating under the control of software program instructions in a memory (which is also used for data storage). The interface couples the respective card 48 to a link 46 in such a way that the operating characteristics of the link are not altered. In the case of optical links 46, for example, the connection may comprise an optical power splitter; for electrical links the connection may be a bridging isolator, or in the case of an Ethernet network LAN taps may be used.

Monitoring of the Gn links 46 in this manner enables telecoms signalling analysis and service usage analysis to be performed as described herein in respect of mobile users located within the service area of their "home" network. If the network operator wishes to extend the analysis to include users who are roaming within other GPRS networks 32 (FIG. 1), then monitoring is extended to cover the Gp links connecting the SGSN 26 and the GGSN 28 to those other GPRS networks, as they contain the SGSN/GGSN nodes through which the relevant messages will pass.

The program instructions for the processor in each monitoring card 48 include code implementing a GTP parser 50, for generating records of the content of IP signalling units. The GTP parser 50 selects GTP signalling and protocol messages from the network. It does this by monitoring IP traffic on the Gn interface links and selecting UDP traffic with a source or destination port number of 3386 (GTP v0), 2123 (GTP v1, GTP-C control plane messages) or 2152 (GTP v1, GTP-U user plane messages).

A further optional stage to the selection of traffic from the network can be applied by filtering on the destination IP address in the outer layer of IPv4/IPv6. This enables traffic destined for the interfaces of one particular network element (GGSN or SGSN) to be selected. It also facilitates the partitioning of IP traffic by address space so that processing capacity can be managed at the level of the monitoring cards 48.

The GTP header in each selected packet is parsed to extract the MT field value and packets with the following types are selected and time stamped for further processing:

| | |
|---|---|
| Create PDP Context Request | (MT = 16) |
| Create PDP Context Response | (MT = 17) |
| Update PDP Context Request | (MT = 18) |
| Update PDP Context Response | (MT = 19) |
| Delete PDP Context Request | (MT = 20) |
| Delete PDP Context Response | (MT = 21) |
| SGSN Context Request | (MT = 50) |
| SGSN Context Response | (MT = 51) |
| SGSN Context Acknowledge | (MT = 52) |
| T-PDU (GTP v0), G-PDU (GTP v1) | (MT = 255) |

All other GTP message types are discarded.

The selected GTP messages are then forwarded by the link monitoring cards 48 to a central (e.g. site level) server 52 for further processing, where they are received by an Input Manager module 54. This module collates and time-orders the GTP messages from the GTP parsers in the monitoring cards. The time ordering is based on a sliding window of the time stamps applied by the GTP parsers, the size of the sliding window being adapted to the volume and throughput of traffic from the input sources. The Input Manager modules then passes the time-ordered messages to a GTP module 56 that implements the GTP Follower state machine.

The GTP module 56 provides two functions. Firstly, it processes GTP signalling messages to maintain its tracking of tunnel state information, and secondly, it forwards all protocol messages that contain a payload length value greater than zero in the GTP header.

The information provided for each tunnel is:
IMSI and NSAPI (Network Service Access Point Identifier);
APN;
QoS Profile;
Tunnel start address (SGSN);
Tunnel end address (GGSN).

Each message processed by the GTP module 56 is examined to see if it is a T-PDU/G-PDU or one of the signalling messages selected by a GTP parser 50. Signalling messages are used by the GTP module 56 to maintain tunnel state information and are not passed on to the other components.

The T-PDU/G-PDU messages are associated with the tunnel context in which they are being carried and are passed on to the CRG module for further processing.

The GTP module 56 provides a service interface that the other system components use to obtain access to a per-tunnel data area in which private state information may be kept by each component, and in which the SUR is assembled for output.

Another service provided by the GTP module 56 is the identification of 'traffic flow direction', information that is made available to the other system modules. Hitherto it has been very difficult to determine with certainty a packet's direction of travel. The problem is to how to identify in an efficient manner whether an IP packet is going from an MS towards the core network (Mobile Originated) or from the core network to the MS (Mobile Terminated). Methods used previously involve identifying all the autonomous system network IP addresses on one side of the monitoring point and maintaining, by manual editing, a list of those addresses. The monitoring system loads the list for comparison to the destination address field in monitored packets, to ascertain whether a packet is coming from or going to an address in the list. Such a list can be very large and easily contain several hundred network addresses and network masks. A further deficiency in this approach is that network administration and routing policies undergo constant change, so the list is usually never a definitive statement of fact, but only a confidence check. The contents can never be created with certainty where interaction between large and dynamic networks is involved.

The packet direction determination method used by the GTP module 56 is simple, efficient and dynamic. Processing of the GTP signalling information allows the GTP module 56 to identify and maintain a cache of the relatively small number of GGSN addresses in the network. As all tunnel activity must originate or terminate at a GGSN, each monitored message can be tagged as Mobile Originated or Mobile Terminated by this module. As can be seen in FIG. 2, the bottom layer 44 in the protocol stack is the tunnel IP layer and the addresses are always those of SGSNs 26 and GGSNs 28. Analysis of the Create PDP Context messages (MT=16) allows a set of GGSN addresses to be created dynamically.

For example, both GTPv0 and GTPv1 Create messages always have a source address that is an SGSN interface and a destination address that is a GGSN interface. As signalling messages are processed (and as new GGSNs are added to the network), monitoring of these signalling messages reveals the new interface addresses. As soon as a GGSN address is placed in the cache, the direction of the tunnelled data, which starts at the upper IP layer in FIG. 2, can be determined from the rule: if the tunnel destination address is a GGSN, the tunnelled data is Mobile Originated, else the tunnelled data is Mobile Terminated.

Thus hundreds of thousands of wireless device addresses and tens of thousands of core network addresses may be ignored. Knowledge of just tens of tunnel endpoint addresses allows the system to determine, with absolute accuracy, whether a packet is Mobile Originated or Mobile Terminated. Further this method uses tunnel signalling messages to determine dynamically the IP addresses of the tunnel endpoints. Data tunnel Create, Update and Delete signalling messages are used to cache the IP addresses of the servers that provide the network tunnels. In any GPRS or UMTS network there are relatively few tunnel servers, and tunnels originate at an SGSN and terminate at a GGSN. There are always fewer GGSNs in a network, so the address set for them is smaller than for SGSNs. A large network may have, for example, six SGSNs and four GGSNs; each GGSN has two IP network interfaces. Thus an IP address set of eight elements would be sufficient to determine the transmission direction of all wireless data traffic in the network. With the anticipated adoption of IPv6 addresses the total address space will rise dramatically, increasing the value of this method still further.

A CRG module 58 builds records of TCP and UDP transactions, or 'flow summaries', from the forwarded T-PDU/G-PDU protocol messages, using only the inner or tunnelled IP and TCP/UDP headers (layers 36 and 38 in FIG. 2).

One function of the CRG module is to aggregate individual measurements into a single summary record. Measurements created by this module may include packet and octet counts attributed to each service activation and the identification of anomalous packet and octet sequences that adversely affect network performance. This count information is conveniently split between upstream (Mobile Originated) and downstream (Mobile Terminated) counts.

The CRG module 58 processes all the T-PDU/G-PDU messages forwarded by the GTP module 56. However, it will only pass on those actually containing application layer content; those containing only transport signalling are filtered out of the processing stream by this module.

In the example depicted in FIG. 3 single CRG module 58 builds summary records for the service activation TCP and UDP transport layers. If it is desired to extend the system's capability to other transports such as Wireless Session Protocol (WSP) and Wireless Datagram Protocol (WDP), which are used to deliver Wireless Application Protocol (WAP) services, a separate Wireless CRG (WCRG) module could be introduced. This new module would process data within the same system as the CRG module 58.

Whilst it is assumed that only one service is active at a time, that service may consist of multiple simultaneous Transport layer Flow summaries (T-flows). Therefore the CRG module 58 monitors the number of simultaneous T-flows with a given GTP Flow summary (G-flow), and upon completion of the service activation (as indicated by a CA module, described below), makes available the whole SUR. For those T-flows that have no CA payload, or protocol that is not TCP, or UDP not equal to 6 or 17, the CRG module 58 outputs the SUR record based on expiry of a timer or when instructed by one of the CA modules 60.

Following processing by the CRG module 58, the messages are forwarded to a set of CA (Content Analysis) modules 60. Each module is specialised for the identification and analysis of particular content in the application layer (layer 34 in FIG. 2). This application content may be a single protocol, or a set of protocols that are used to deliver a service.

Generally the CA modules 60 examine application message header content rather than actual message data. Message headers are assumed to be standard Internet headers as specified in the IETF Request for Comments RFC 822 (Format of ARPA Internet Text Messages). The CA modules are organised into a processing chain, for example with the order reflecting the volume of service use in the network. As each module 60 examines a message, it applies tests to determine whether the message should be processed or handed on. If the tests fail, the message is handed on to the next CA module 60 in the chain.

A special CA module 60 called the null CA module is placed at the end of the CA module processing chain to catch any content not recognised by the CA modules prior to it. The null module attempts to use inter-message gap analysis, the message exchange signature and analysis of port numbers to determine when a session activation has begun and ended. Unlike other CA modules it depends on the fact that only one service activation is live within a tunnel at any time, which simplifies the analysis.

A major benefit of the null CA module is that it can continue to operate normally when it is processing encrypted traffic. The analysis applied by the module is based purely on timing and traffic exchange patterns and not on the actual content.

The CA modules 60 are followed by an output formatter 64 that creates the Service Usage Records in the required format and writes them to a specified output stream (file or FIFO buffer). The output formatters may for example create an XML (Extensible Markup Language) format SUR, or a binary format V36 structure.

An SUR is composed of a header followed by three independent sections: G-flow, T-flow and Service Flow summary (S-flow). Each section is independent because they are built using different layers of the stack with no reference to the other layers.

The SUR has a short header section that identifies the version of SUR format:

| Field Name | Values | Comments |
| --- | --- | --- |
| Version | 1 . . . n | SUR structure version number. |

The G-Flow section (<gtp_flow>) contains information derived by the GTP module 56 from the outer IP, UDP and GTP layers of the stack (layers 40 to 44 in FIG. 2) and provides the 'telecoms context' for the following two sections. It also provides summary information on the GTP tunnel. Significant fields in this section include the IMSI, APN, QoS profile, source address (the SGSN) and destination address (the GGSN).

| Field Name | Values | Comments |
| --- | --- | --- |
| gtp_version | 0, 1 | GTP protocol version. |
| output_reason | SgsnInitDelete GgsnInitDelete ServiceCompletion CreateFail SgsnUpdateFail UpdateFail | Explanation of the trigger that caused the SUR build to be terminated and output from SURGE. |
| imsi | 234122334455163 | IMSI of MS attached to tunnel. |
| nsapi | 0 | The NSAPI of the tunnel. |
| apn_string | wap.telco.com | Printable APN for tunnel. |
| apn_hex | 0x377F2C5 . . . | Hex string of unmodified APN value. |
| qos_profile | 0x010203 | Hex string of 3 octet GTP QoS profile requested by the MS in Create PDP Context Request. |
| negot_qos | 0x010203 | Hex string of 3 octet GTP QoS profile granted to the MS in the Create PDP Context Request or in subsequent Update PDP Context Request messages. |
| source_address | n.n.n.n | Source address of tunnel; an SGSN IP interface. |
| destination_address | n.n.n.n | Destination address of tunnel; a GGSN IP interface. |
| uplink_packets | 0 . . . n | Count of GTP messages from SGSN. |
| uplink_octets | 0 . . . n | Count of octets from SGSN. |
| downlink_packets | 0 . . . n | Count of GTP messages from GGSN. |
| downlink_octets | 0 . . . n | Count of octets from GGSN. |
| start_time | n:n | Tunnel creation time. |
| end_time | n:n | Tunnel deletion time. |
| update_requests | 0 . . . n | Count of Update PDP Context Request messages seen for tunnel. |
| init_create_fails | 0 . . . n | |
| sub_create_fails | 0 . . . n | |
| sub_create_successes | 0 . . . n | |
| update_fails | 0 . . . n | |
| update_successes | 0 . . . n | |
| delete_fails | 0 . . . n | |
| unexpected_messages | 0 . . . n | |

The T-Flow section (<tflow>) contains measurements derived by the CRG module 58 from the tunnelled IP and TCP/UDP layers (36 and 38 in FIG. 2).

| Field Name | Values | Comments |
| --- | --- | --- |
| uplink_ip_address | n.n.n.n | IP address as 4-dotted decimal integers. |
| downlink_ip_address | n.n.n.n | IP address as 4-dotted decimal integers. |
| uplink_port | 1 . . . 65365 | TCP or UDP port number. |
| downlink_port | 1 . . . 65365 | TCP or UDP port number. |
| protocol | N | Protocol number, optionally with acronym (e.g. 6 - TCP) |
| type_of_service | n | TOS field from the IP header. |
| uplink_packets | 0 . . . n | Number of packets. Each fragment counts as one packet. Flows can be simplex. |
| uplink_octets | 0 . . . n | Payload octets. |
| downlink_packets | 0 . . . n | Number of packets. |
| downlink_octets | 0 . . . n | Payload octets. |
| uplink_anom_pkts | 0 . . . n | For TCP, a packet with an unexpected sequence number is considered anomalous. For UDP, a packet with the same checksum in recent history is considered anomalous. |
| uplink_anom_octets | 0 . . . n | For TCP the measure is "the product of the number of jumps and an estimate of median sequence number jump". Alternatively the measure could be an estimate of retransmitted octets. For UDP, the sum of payload count of anomalous packets. |
| downlink_anom_pkts | 0 . . . n | For TCP, a packet with an unexpected sequence number is considered anomalous. For UDP, a packet with the same checksum in recent history is considered anomalous. |
| downlink_anom_octets | 0 . . . n | For TCP the measure is "the product of the number of jumps and an estimate of median sequence number jump". Alternatively the measure could be an estimate of retransmitted octets. For UDP, the sum of payload count of anomalous packets. |
| uplink_mtu | 0 . . . n (octets) | The maximum size of (possibly fragmented) IP packets |
| downlink_mtu | 0 . . . n (octets) | The maximum size of (possibly fragmented) IP packets |
| uplink_fragments | 0 . . . n | Count of IP fragments |
| downlink_fragments | 0 . . . n | Count of IP fragments |
| uplink_active_secs | 0 . . . n | The number of active seconds in the flow. |
| downlink_active_secs | 0 . . . n | The number of active seconds in the flow. |
| uplink_max_throughput | 0 . . . n | The maximum throughput during an active second. |
| downlink_max_throughput | 0 . . . n | The maximum throughput during an active second. |
| uplink_min_throughput | 0 . . . n | The minimum throughput during an active second. |
| downlink_min_throughput | 0 . . . n | The minimum throughput during an active second. |
| uplink_avg_throughput | 0 . . . n | The average throughput during an active second. |
| downlink_avg_throughput | 0 . . . n | The average throughput during an active second. |
| uplink_first_active_sec_throughput | 0 . . . n | The throughput during the first active second |
| downlink_first_active_sec_throughput | 0 . . . n | The throughput during the first active second |
| uplink_throughput_variance | 0.0 . . . x (as a float) | The variance of throughput during the active seconds |
| downlink_throughput_variance | 0.0 . . . x (as a float) | The variance of throughput during the active seconds |
| resp_time_measures | 0 . . . n | Number of response time measurements made. |
| min_resp_time | 0 . . . n | Minimum response time over the set of T-flows in millisecs. |
| max_resp_time | 0 . . . n | Maximum response time over the set of T-flows in millisecs. |
| first_resp_time | 0 . . . n | Response time of first flow within the G-layer. |
| avg_resp_time | 0 . . . n | Average of all T-layer response times in millisecs. |
| resp_time_variance | 0.0 . . . x (float value) | Variance of T-layer response times in millisecs squared. |
| start_time | n:m | First flow start time in secs:nanosecs. |

-continued

| Field Name | Values | Comments |
|---|---|---|
| end_time | n:m | Last flow end time in secs:nanosecs. |
| count_tflows | 1 . . . n | Total number of T-flows seen during service session. |
| Simultaneous_tflows | 1 . . . n | Total number of simultaneous T-flows. |

The S-flow, or ServFlow, section (<serv_flow>) is a service- or protocol-specific group of measurements created by the specialised CA modules 60. Sections for HTTP, POP3 and SMTP are defined below. Any other protocol is reported as 'Unknown'.

The S-flow section suggests whether or not the service activation was successful as a 'service transaction' using the activation_status_code field. A service is deemed to be successful if interaction with the service provider system was possible.

It is left to the SUR consumer to use the full information in the SUR for its own purposes and decide whether it wishes to report success or failure of a service activation. The activation status code value is present to allow applications such as the GPRS QoS measurement engine to count service activations in the same manner as SS7 TCAP transactions. Where an IPDR is output after each e-mail item transfer within a session, the service status code can be obtained directly from the protocol.

Web Service—HTTP

| Field Name | Values | Comments |
|---|---|---|
| service_name | Web | |
| content_type | HTTP | |
| uri | /ads/graphics/cs.gif | Path name portion of URL. |
| activation_status_code | n | SUR summary status code |
| activation_status_msg | string | SUR summary status message |
| service_status_code | n | See RFC2616 section 10 for list. |
| service_status_msg | string | Service/protocol status message |
| start_time | n:m | Time of first application message |
| response_time | n:m | Time of first return message |
| end_time | n:m | Time of last message |

E-mail Service—POP3 Protocol

| Field Name | Values | Comments |
|---|---|---|
| service_name | E-mail | |
| content_type | POP3 | |
| sucessful_item_transfers | 1 . . . n | Count of items downloaded from server |
| unsuccessful_item_transfers | 1 . . . n | Count of items requested from server but not downloaded |
| max_item_size | 1 . . . n | Average item size downloaded |
| avg_item_size | 1 . . . n | Total data downloaded in session |
| total_items_size | n:m | Time of first message |
| activation_status_code | n | SUR summary status code |
| activation_status_msg | string | SUR summary status message |
| service_status_code | n | See RFC2616 section 10 for list. |
| service_status_msg | string | Service/protocol status message |
| start_time | n:m | Time of first application message |
| response_time | n:m | Time of first return message |
| end_time | n:m | Time of last message |

E-mail Service—SMTP Protocol

| Field Name | Values | Comments |
|---|---|---|
| service_name | Email | |
| content_type | SMTP | |
| transfer_direction | Sent | Indicates direction of transfer for session. |
| | Received | An SMTP session may only |
| | Unknown | be one way. |
| sucessful_item_transfers | 1 . . . n | Count of items downloaded from server |
| unsuccessful_item_transfers | 1 . . . n | Count of items requested from server but not downloaded |
| Unsuccessful_mails_sent_up | 1 . . . n | Email items client failed to send to server |
| max_item_size | 1 . . . n | Average item size downloaded |
| avg_item_size | 1 . . . n | Total data downloaded in session |
| total_items_size | n | Time of first message |
| activation_status_code | n | SUR summary status code |
| activation_status_msg | string | SUR summary status message |
| service_status_code | n | See RFC2616 section 10 for list. |
| service_status_msg | string | Service/protocol status message |
| start_time | n:m | Time of first application message |
| response_time | n:m | Time of first return message |
| end_time | n:m | Time of last message |

Unknown Services

| Field Name | Values | Comments |
|---|---|---|
| service_name | Unknown | |
| content_type | Unknown | |
| activation_status_code | n | SUR summary status code |
| activation_status_msg | string | SUR summary status message |
| service_status_code | n | Service/protocol summary or return code |
| service_status_msg | string | Service/protocol status message |
| start_time | n:m | Time of first application message |
| response_time | n:m | Time of first return message |
| end_time | n:m | Time of last message |

No S-flow Records present

| Field Name | Values | Comments |
|---|---|---|
| content_type | No Content Seen | No application messages have been seen and the SUR contains only G-flow and T-flow values. |

The invention claimed is:

1. A method of creating service usage records summarising usage of mobile data communications services, comprising:
monitoring message packets traversing a signalling link between a serving support node and a gateway support node, said message packets including packets for tunnelling data being transported by a mobile data communications service;

extracting from said data tunnelling packets first information relating to data being tunnelled by said packets;

extracting from said data tunnelling packets second information relating to implementation of the data tunnelling; and correlating said first and second information to generate a service usage record.

2. The method of claim 1, wherein the data communications service is a General Packet Radio Service (GPRS), and the signalling link provides a Gn interface between a Serving GPRS Support Node (SGSN) and a Gateway GPRS Support Node (GGSN).

3. The method of claim 2, wherein message packets traversing a signalling link providing a GPRS Gp interface are also monitored.

4. The method of claim 1, wherein the data tunnelling packets are GPRS Tunnelling Protocol (GTP) packets, and packets selected for data extraction have a source or destination port number of 3386, 2123 or 2152.

5. The method of claim 4, wherein each data tunnelling packet selected for data extraction has a Message Type field value of 16 to 21, 50 to 52 or 255.

6. The method of claim 1, wherein the first information includes at least one of International Mobile Subscriber Identity (IMSI), GPRS Access Point Name (APN), Quality of Service (QoS) profile, source address and destination address.

7. Apparatus for creating service usage records summarising usage of mobile data communications services, comprising:

a monitor for monitoring message packets traversing a signalling link between a serving support node and a gateway support node, said message packets including packets for tunnelling data being transported by a mobile data communications service;

a first information extractor for extracting from said data tunnelling packets first information relating to data being tunnelled by said packets;

a second information extractor for extracting from said data tunnelling packets second information relating to implementation of the data tunnelling; and a correlator for correlating said first and second information to generate a service usage record.

8. The apparatus of claim 7, wherein the data communications service is a General Packet Radio Service (GPRS), and the signalling link provides a Gn interface between a Serving GPRS Support Node (SGSN) and a Gateway GPRS Support Node (GGSN).

9. The apparatus of claim 8, including a monitor for monitoring message packets traversing a signalling link providing a GPRS Gp interface.

10. The apparatus of claim 7, wherein the data tunnelling packets are GPRS Tunnelling Protocol (GTP) packets, and packets selected for data extraction have a source or destination port number of 3386, 2123 or 2152.

11. The apparatus of claim 10, wherein each data tunnelling packet selected for data extraction has a Message Type field value of 16 to 21, 50 to 52 or 255.

12. The apparatus of claim 7, wherein the first information includes at least one of International Mobile Subscriber Identity (IMSI), GPRS Access Point Name (APN), Quality of Service (QoS) profile, source address and destination address.

* * * * *